United States Patent
Lee et al.

(10) Patent No.: US 8,635,399 B2
(45) Date of Patent: Jan. 21, 2014

(54) REDUCING A NUMBER OF CLOSE OPERATIONS ON OPEN BLOCKS IN A FLASH MEMORY

(75) Inventors: Cheng-fan Lee, Taipei (TW); Hung-min Chang, Taipei (TW); Po-jen Hsueh, Taipei (TW)

(73) Assignee: STEC, Inc., Santa Ana, CA (US)

( * ) Notice: Subject to any disclaimer, the term of this patent is extended or adjusted under 35 U.S.C. 154(b) by 0 days.

(21) Appl. No.: 13/611,577

(22) Filed: Sep. 12, 2012

(65) Prior Publication Data

US 2013/0097365 A1  Apr. 18, 2013

Related U.S. Application Data

(60) Provisional application No. 61/548,313, filed on Oct. 18, 2011.

(51) Int. Cl.
*G06F 12/00* (2006.01)

(52) U.S. Cl.
USPC .................................. 711/103; 711/E12.008

(58) Field of Classification Search
None
See application file for complete search history.

(56) References Cited

U.S. PATENT DOCUMENTS

| | | | |
|---|---|---|---|
| 6,948,026 B2 * | 9/2005 | Keays | 711/103 |
| 7,454,558 B2 * | 11/2008 | Keays | 711/103 |
| 7,818,493 B2 * | 10/2010 | Traister et al. | 711/103 |
| 8,112,573 B2 * | 2/2012 | Keays | 711/103 |
| 8,316,176 B1 * | 11/2012 | Phan et al. | 711/103 |
| 2003/0041210 A1 * | 2/2003 | Keays | 711/103 |
| 2005/0273551 A1 * | 12/2005 | Keays | 711/103 |
| 2008/0091901 A1 | 4/2008 | Bennett et al. | |
| 2009/0070518 A1 * | 3/2009 | Traister et al. | 711/103 |
| 2009/0125670 A1 * | 5/2009 | Keays | 711/103 |
| 2010/0174853 A1 | 7/2010 | Lee et al. | |
| 2010/0241792 A1 | 9/2010 | Lee | |
| 2012/0137056 A1 * | 5/2012 | Keays | 711/103 |

OTHER PUBLICATIONS

Liu, Pangfeng et al. "Blocked-based Allocation Algorithms for FLASH Memory in Embedded Systems." Department of Computer Science and Information Engineering, National Taiwan University, Taipei, Taiwan. PaCT 2007. No month Listed. LNCS 4671. pp. 569-578. 10 pages.
Maine, Michael et al. "Data Structures & Other Objects Using C++." Addison Wesley Longman. Aug. 1998. pp. 366, 367, 372, 374 and 375. 7 pages.
No Author Listed. "SmartMedia™ Format Introduction (Software Considerations)." Samsung Memory Product & Technology Division. Jul. 13, 1999. 28 pages.
No Author Listed. "Technical Note: Wear-leveling Techniques in NAND Flash Devices." *Micron. TN-29-42: Wear-Leveling Techniques in NAND Flash Devices.* Oct. 2008. 8 pages.

* cited by examiner

*Primary Examiner* — Kevin Verbrugge
(74) *Attorney, Agent, or Firm* — Wilmer Cutler Pickering Hale and Dorr LLP

(57) ABSTRACT

The disclosed subject matter includes a memory system with a flash memory and a flash memory controller. The flash memory controller is configured to divide the flash memory into virtual segments, each segment including blocks of flash memory cells. The controller is also configured to receive a write request to a location designated by a memory identifier and to map the memory identifier to a segment. When the segment matches an open segment and an open block can store the data, the controller is configured to retrieve the open segment and the open block from a collection tracking open blocks and to write the data to the open block. When the segment is different from the open segment, the controller is configured to close the open block, to write the data to a block in the segment, and to update the collection with the block in the segment.

20 Claims, 13 Drawing Sheets

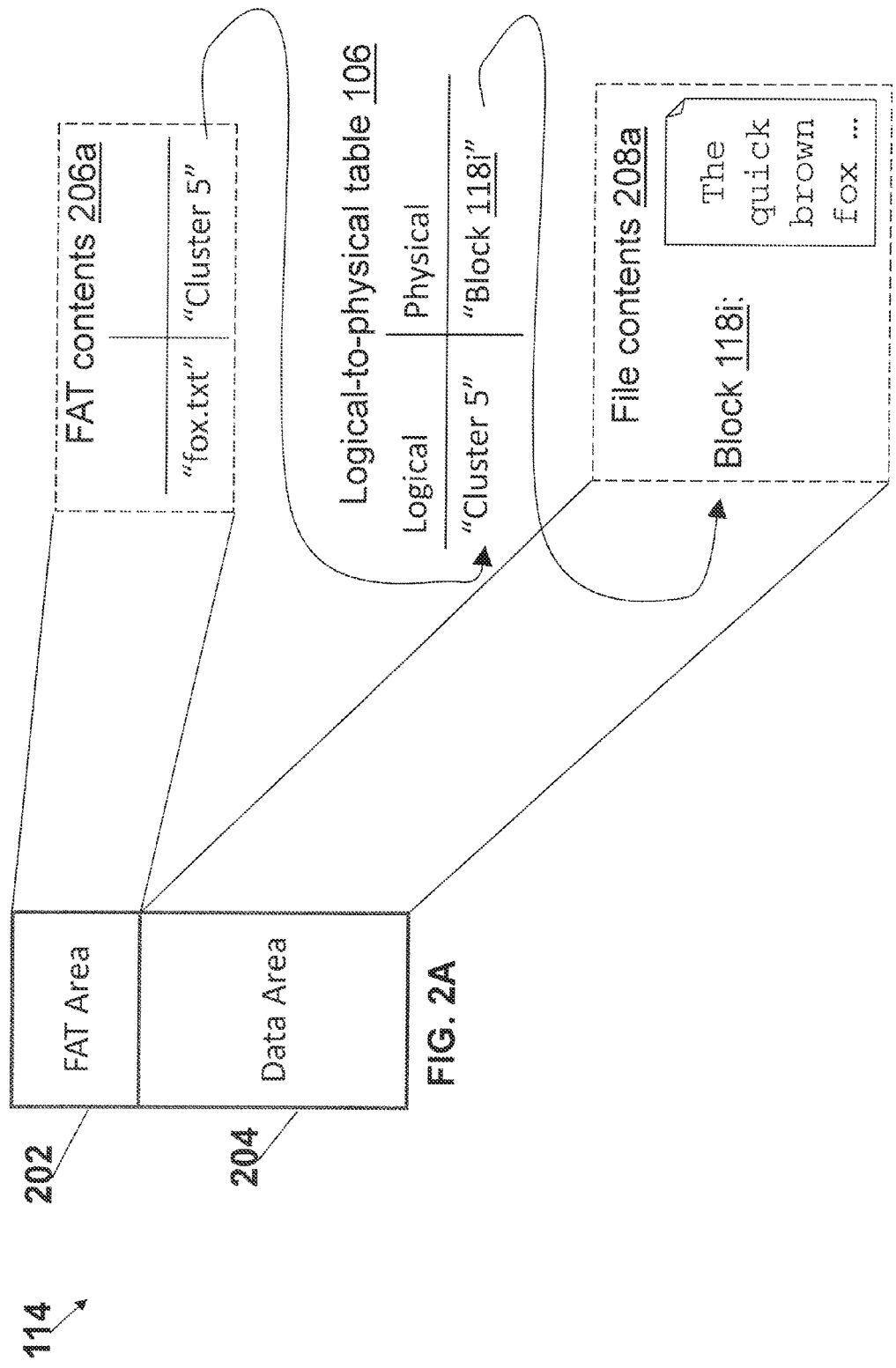

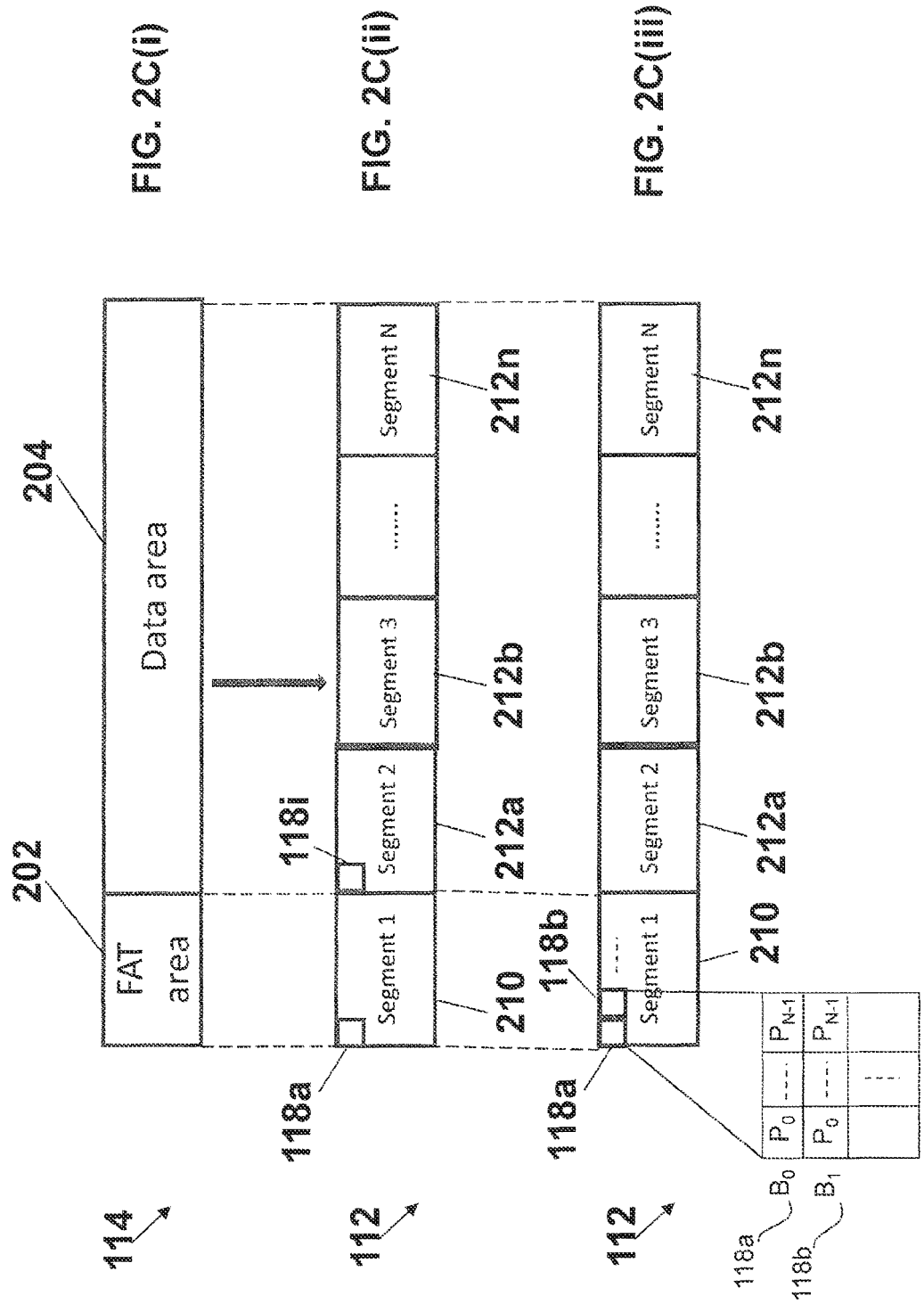

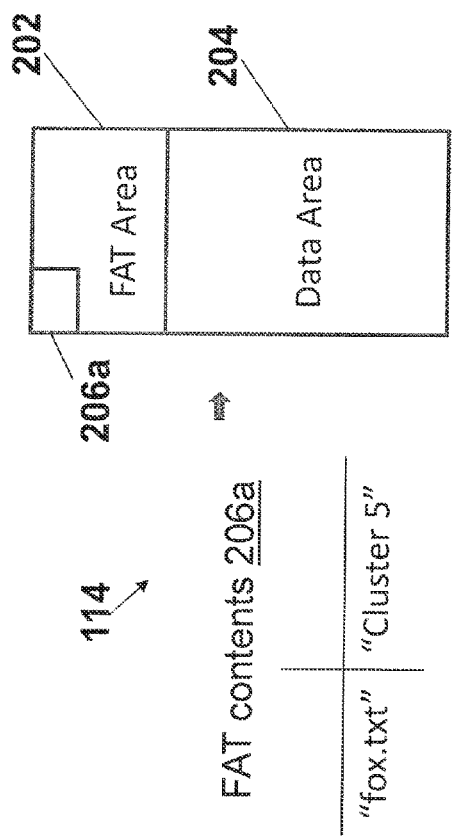
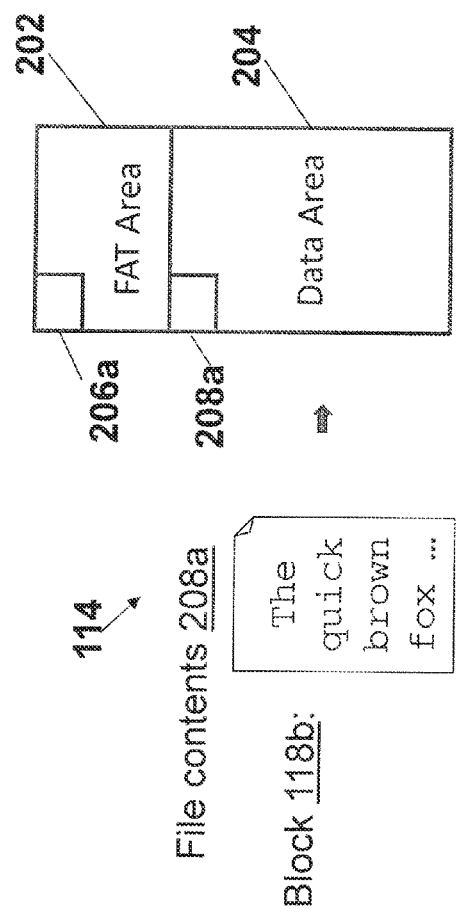

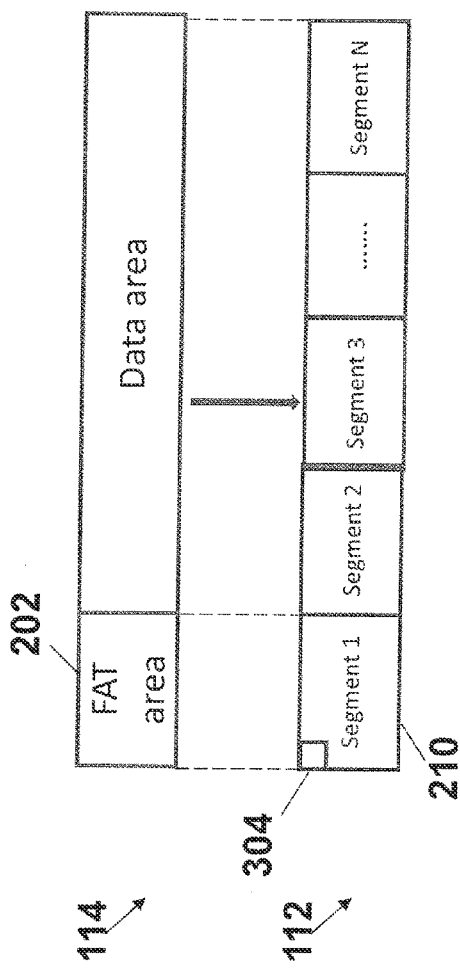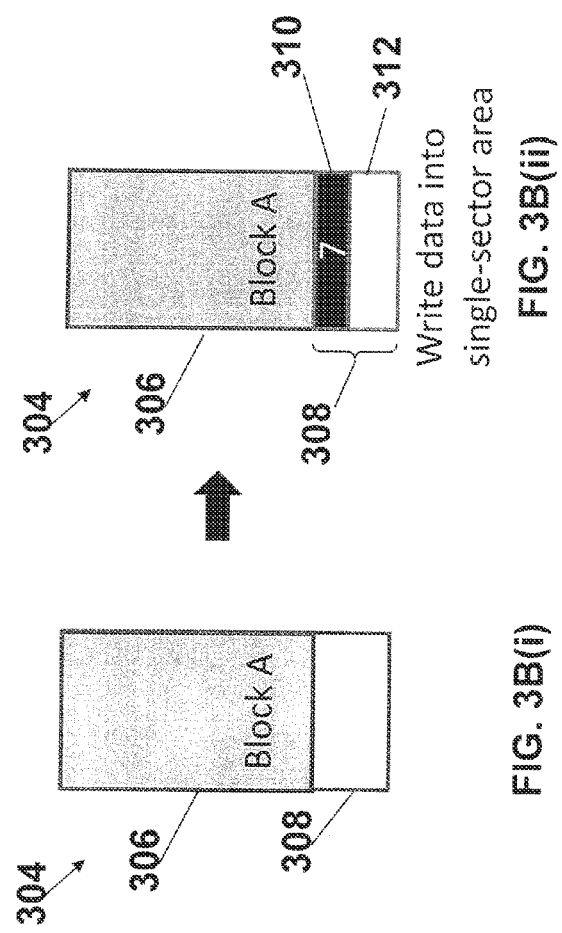

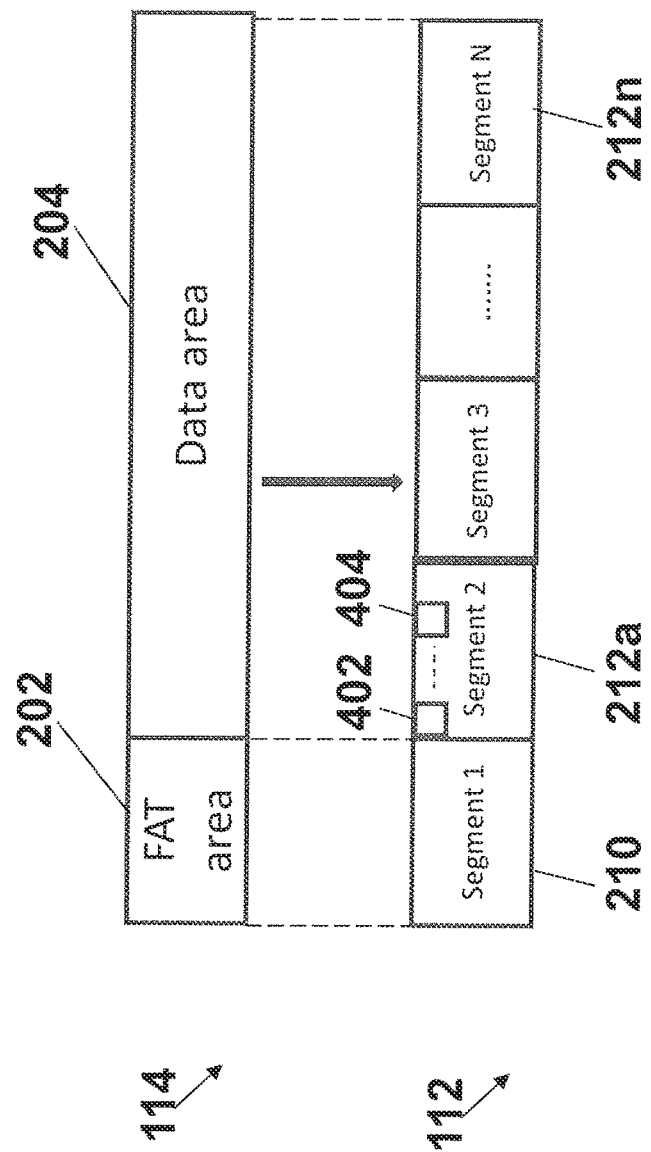

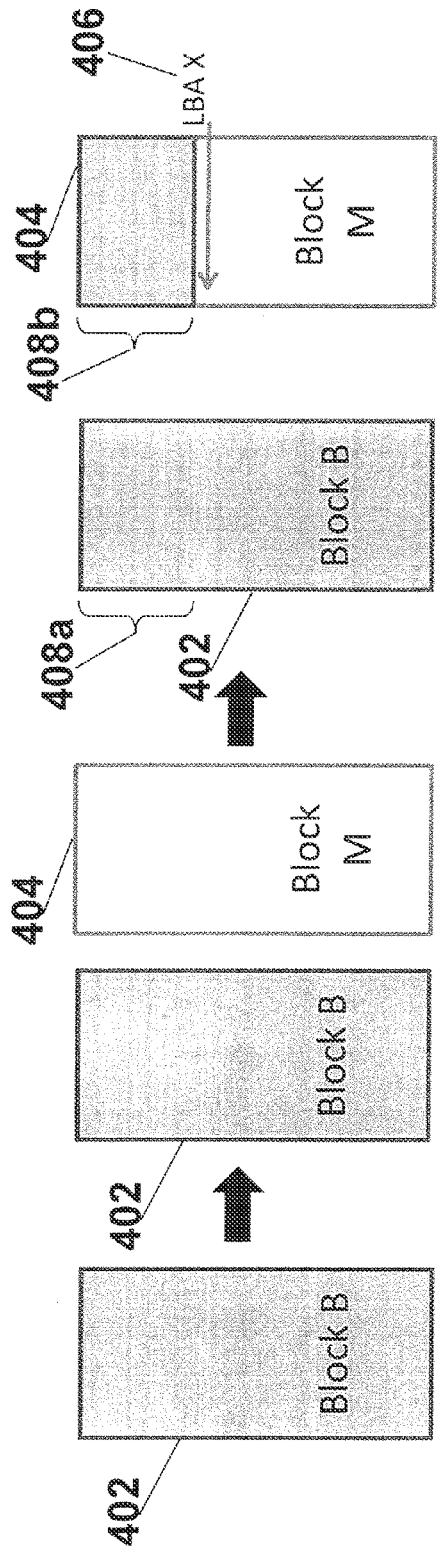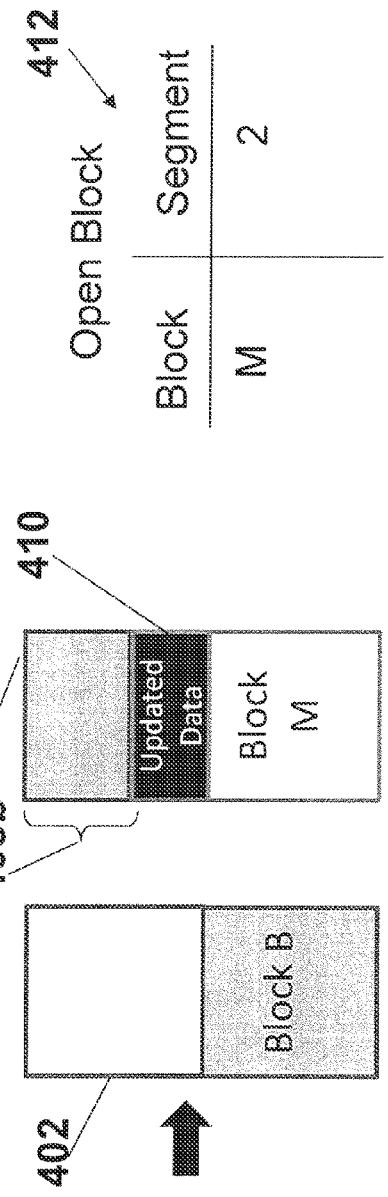

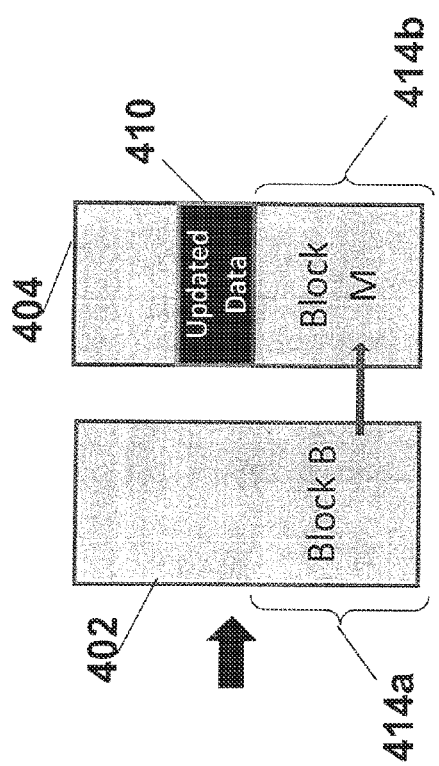
FIG. 4D(i)
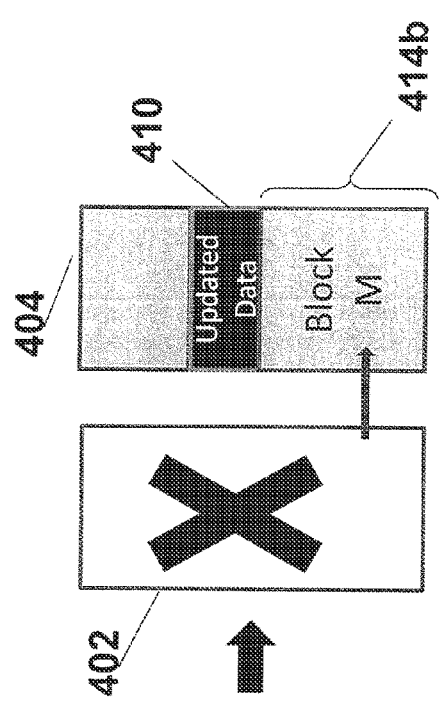
FIG. 4D(ii)
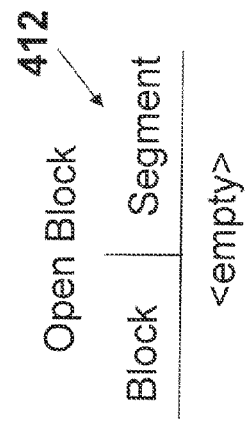
FIG. 4E

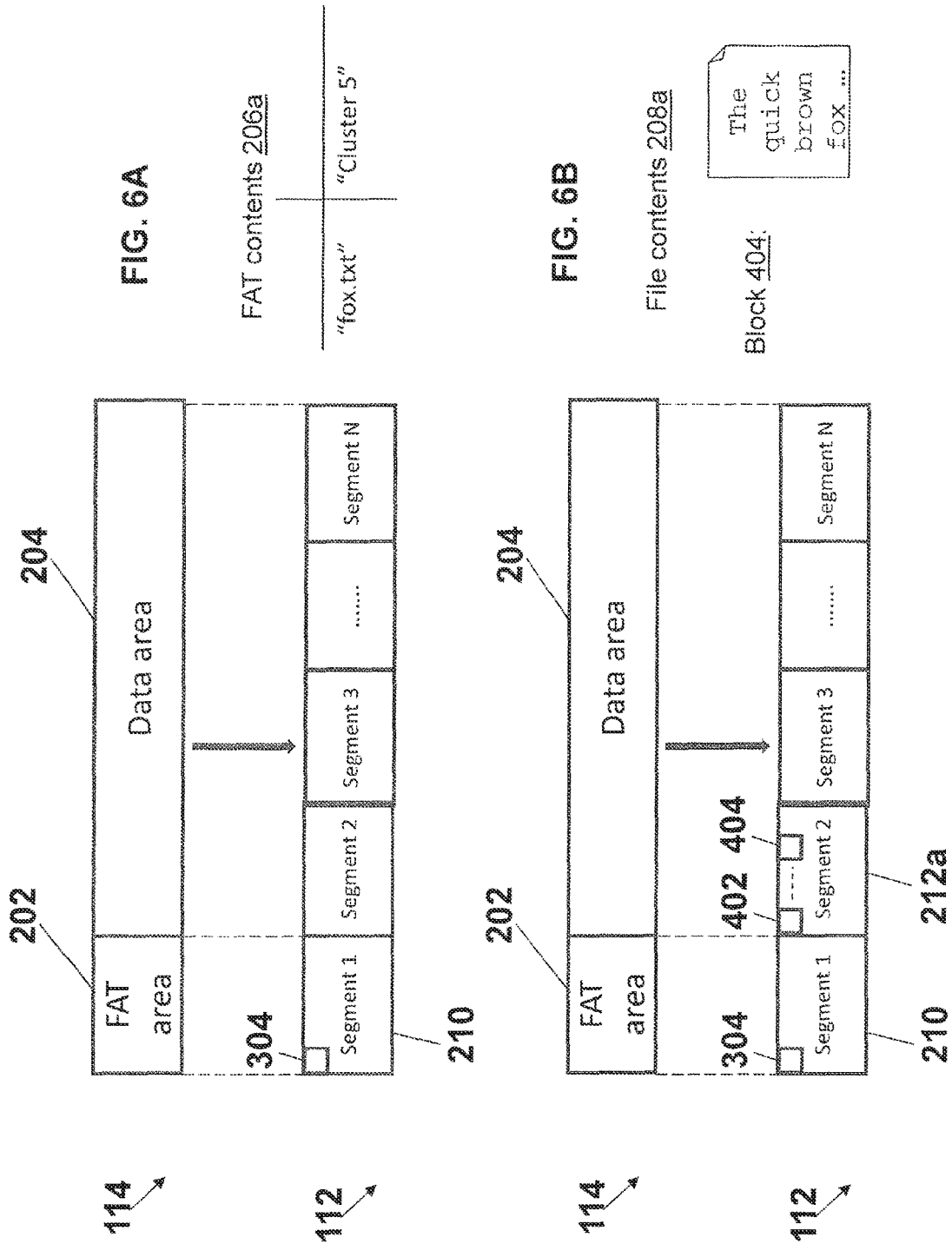

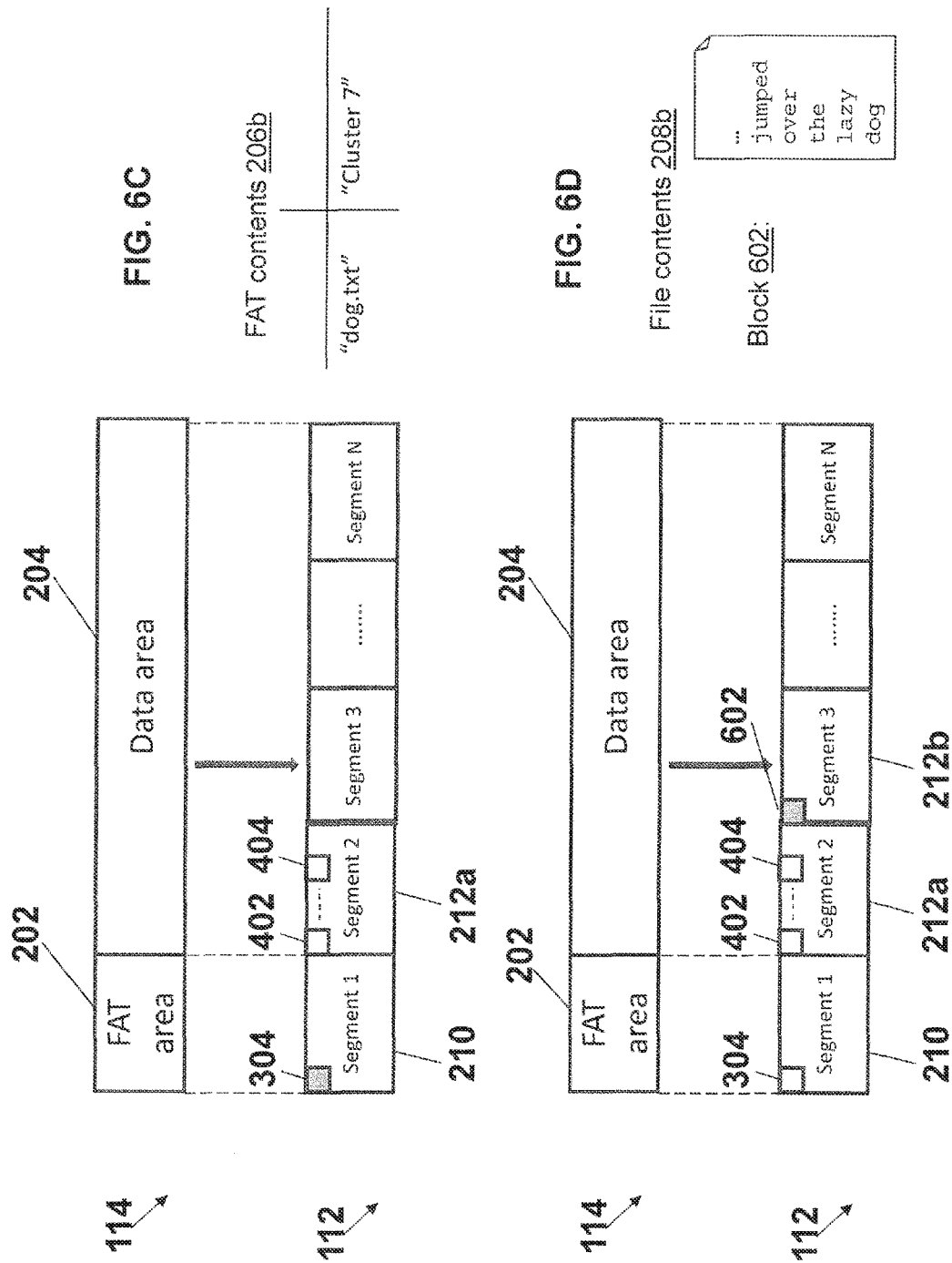

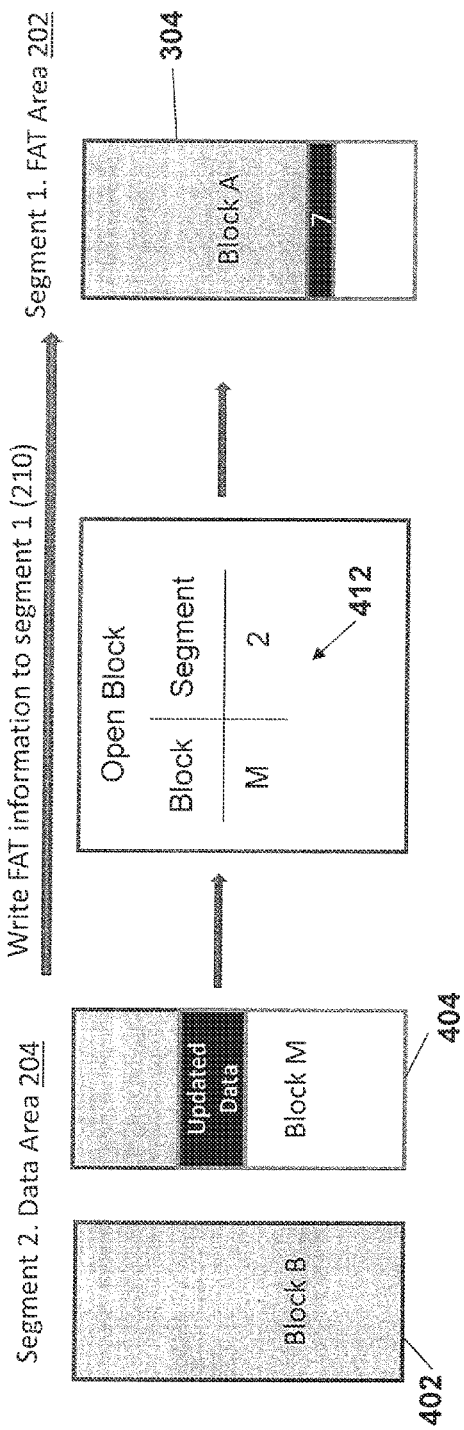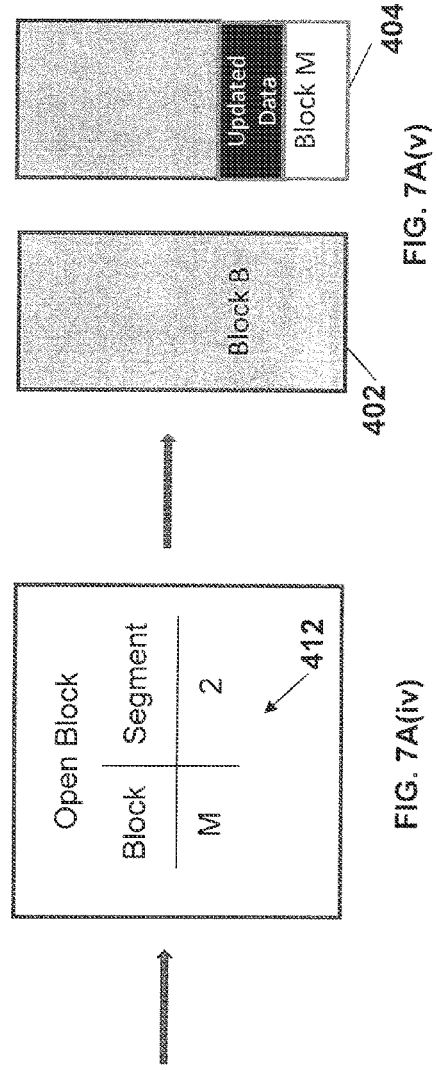

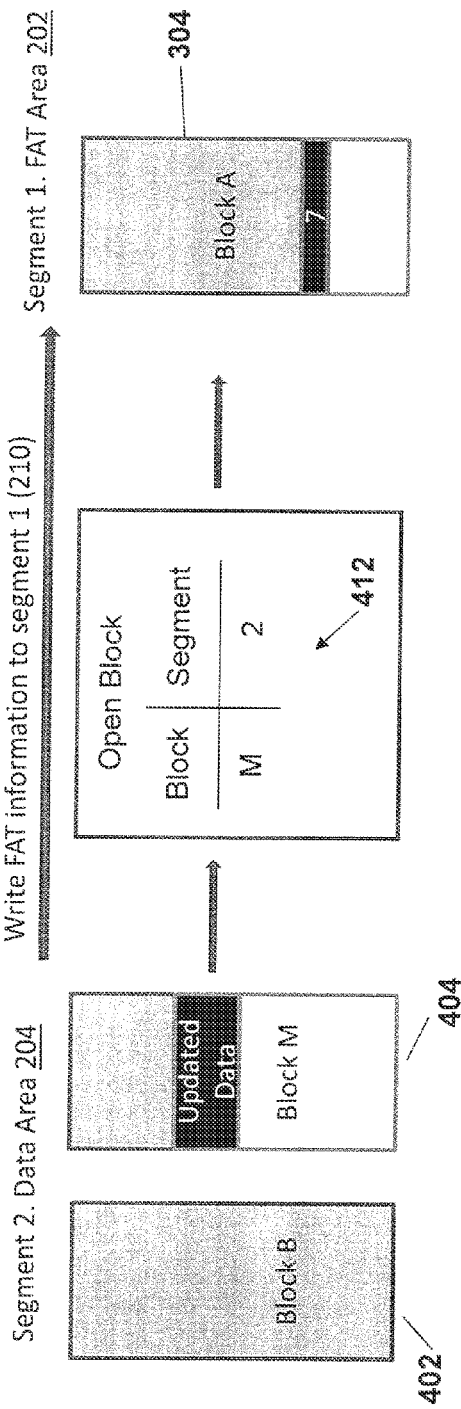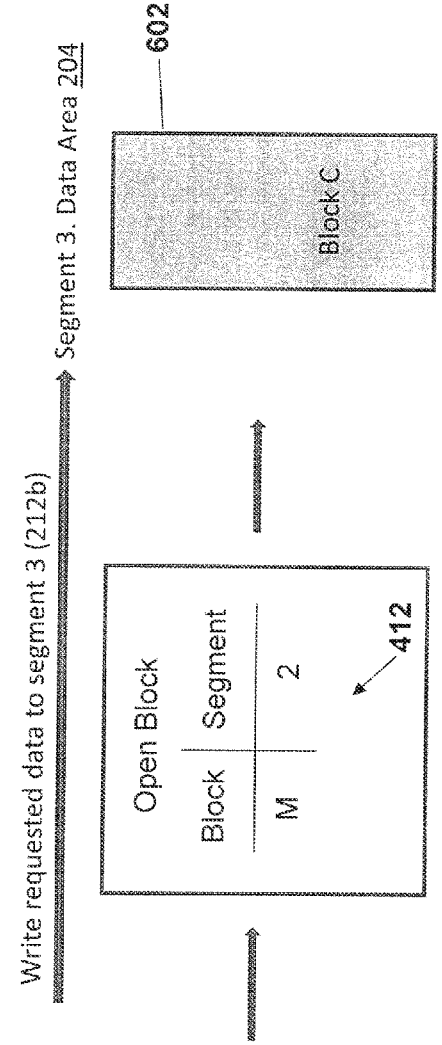

REDUCING A NUMBER OF CLOSE OPERATIONS ON OPEN BLOCKS IN A FLASH MEMORY

CROSS-REFERENCE TO RELATED APPLICATIONS

This application claims benefit under 35 U.S.C. §119(e) of U.S. Provisional Patent Application No. 61/548,313, entitled "SYSTEM AND METHOD OF REDUCING CLOSE OPERATIONS ON OPEN BLOCKS WHEN WRITING DATA TO A FAT FILE SYSTEM," filed Oct. 18, 2011, which is expressly incorporated herein by reference in its entirety.

FIELD OF THE DISCLOSURE

The present disclosure relates generally to the field of semiconductor non-volatile data storage system architectures and methods of operation thereof.

BACKGROUND

Flash memory devices are commonly used as mass data storage subsystems for electronic devices. Such subsystems may be implemented as either removable memory cards that may be inserted into a host system or as non-removable embedded storage within the host system. In both implementations, the subsystem may include one or more flash memory devices and often a flash memory controller.

Flash memory devices are composed of one or more arrays of transistor cells, with each cell capable of non-volatile storage of one or more bits of data. Accordingly, flash memory does not require power to retain data programmed therein. However, once programmed, a cell must be erased before it can be reprogrammed with a new data value. These arrays of cells are partitioned into groups to provide for efficient implementation of read, program (write), and erase functions. A typical flash memory architecture for mass storage arranges groups of cells into erasable blocks, wherein a block includes the smallest number of cells (or unit of erasure) that is erasable at one time. Because a block may contain multiple cells, each block may store multiple data units.

Flash memory is different from other memory used for storage such as hard drives. Flash memory includes unique limitations. First, flash memory has a limited lifetime and exhibits memory wear that can deteriorate the integrity of the storage. Second, because of memory wear, traditional write operations to flash memory can take a comparatively long time due to leveling out potential wear on physical blocks.

Flash memory has a limited lifetime and exhibits memory wear that can deteriorate the integrity of the storage. Each erasable block or segment can be put through a limited number of re-write ("program") and erase cycles before becoming unreliable. In many cases, a memory controller maintains a logical-to-physical block lookup table to translate the flash memory array "physical block" addresses to "logical block" addresses used by the host system. "Physical blocks" refer to the actual blocks in the flash memory array. "Logical blocks" refer to an abstraction of virtual blocks used by the host system when interacting with the physical blocks via the memory controller. The memory controller uses wear-leveling algorithms to determine which physical block to use each time data is programmed. Logical blocks eliminate the relevance of the physical location of data on the flash memory array and enable data to be stored anywhere within the flash memory array.

Because of memory wear, traditional write operations to flash memory can take a comparatively long time due to leveling out potential wear on physical blocks. This is because a traditional write operation to target a logical block address (LBA) requires the flash memory to use a block-based algorithm. An LBA refers to an identifier, or memory address, for accessing a logical block. The block-based algorithm (1) uses a program operation to write data to a new, unused physical block, (2) updates a logical-to-physical-block lookup table to reference the new physical block, and (3) erases the previous physical block associated with the LBA. These program/erase cycles in the flash memory can take a long time for each write operation requested by the host.

Flash memory may store computer files. A file system manages how files are stored, organized, retrieved, and updated on a computer. In particular, a file system generally allows for the organization of files by defining useful abstractions including file names, file metadata, file security, and file hierarchies such as partitions, drives, folders, and directories. One example file system is the File Allocation Table (FAT) file system. The FAT file system is commonly found on flash memory.

The invention provides techniques for reducing the above-described unique limitations associated with flash memory. Ideally, writing data to a FAT file system on the flash memory can be accommodated by tracking blocks available for storage of additional data (referred to in the present disclosure as "open" blocks), and by updating a table of open blocks that lessens the number of undesirable long-running erase operations required when writing files to a FAT file system.

SUMMARY

In accordance with the disclosed subject matter, methods, memory systems, and non-transitory computer program products are provided for reducing the number of close operations performed on open blocks in a flash memory storage.

Certain embodiments include a method for reducing the number of close operations performed on open blocks in a flash memory storage. The method can include dividing the flash memory storage into virtual segments, where each virtual segment includes blocks of flash memory cells. The method can also include receiving a request to write data to a memory location designated by a memory identifier, mapping the memory identifier to a desired segment from among the virtual segments, and retrieving a previously open segment from among the virtual segments and a previously open block from a collection tracking open blocks. When the desired segment matches the previously open segment and the previously open block can store the requested data, the method includes writing the requested data to the previously open block. When the desired segment is different from the previously open segment, the method includes closing the previously open block, writing the requested data to a block in the desired segment, and updating the collection tracking open blocks with the block in the desired segment.

Certain embodiments include a memory system with a flash memory and a flash memory controller. The flash memory can include a plurality of blocks of flash memory cells, where each block is configured to store data. The controller can be configured to divide the flash memory storage into virtual segments, wherein each virtual segment includes blocks of flash memory cells. The controller can also be configured to receive a request to write data to a memory location designated by a memory identifier. The controller can also be configured to map the memory identifier to a desired segment from among the virtual segments. The controller can also be configured to retrieve a previously open segment from among the virtual segments and a previously open block from a collection tracking open blocks. When the desired segment matches the previously open segment and the previously open block can store the requested data, the controller can also be configured to write the requested data to the previously open block. Furthermore, when the desired segment is different from the previously open segment, the controller can be configured to close the previously open block, to write the requested data to a block in the desired segment, and to update the collection tracking open blocks with the block in the desired segment.

Certain embodiments include a non-transitory computer program product, tangibly embodied in a computer-readable medium. The computer program product can include instructions operable to cause a data processing apparatus to divide the flash memory storage into virtual segments, where each virtual segment includes blocks of flash memory cells. The computer program product can also include instructions operable to cause the data processing apparatus to receive a request to write data to a memory location designated by a memory identifier, to map the memory identifier to a desired segment from among the virtual segments, and to retrieve a previously open segment from among the virtual segments and a previously open block from a collection tracking open blocks. When the desired segment matches the previously open segment and the previously open block can store the requested data, the computer program product can also include instructions operable to cause the data processing apparatus to write the requested data to the previously open block. When the desired segment is different from the previously open segment, the computer program product can also include instructions operable to cause the data processing apparatus to close the previously open block, to write the requested data to a block in the desired segment, and to update the collection tracking open blocks with the block in the desired segment.

The embodiments described herein can include additional embodiments. For example, the memory identifier can include a memory address or a logical block address (LBA). The flash memory can be configured with a File Allocation Table (FAT) file system. The FAT file system can include a FAT area and a data area. The FAT area and the data area can correspond to different segments from the virtual segments. The retrieving the previously open segment from among the virtual segments and the previously open block from a collection tracking open blocks can also include determining the previously open segment based on a physical location of the previously open block.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 2A, 2B, 2C(i)-(iii), and 2D(i)-(ii) illustrate block diagrams of writing files to a FAT file system in accordance with some embodiments of the present disclosure.

FIGS. 3A and 3B(i)-(ii) illustrate block diagrams of updating the FAT area of a flash memory with a FAT file system in accordance with some embodiments of the present disclosure.

FIGS. 4A(i)-(ii), 4B(i)-(iv), 4C, 4D(i)-(ii), and 4E illustrate block diagrams of updating the data area of a flash memory with a FAT file system using open blocks and closed blocks in accordance with some embodiments of the present disclosure.

FIGS. 6A-6D illustrate segments used when writing files to the FAT file system, as requested by a host in accordance with some embodiments of the present disclosure.

FIGS. 7A(i)-(v) and 7B(i)-(v) illustrate block diagrams of a system for reducing a number of close operations required for writing data to a FAT file system in accordance with some embodiments of the present disclosure.

DETAILED DESCRIPTION

The present system tracks blocks that are available for the storage of additional data (referred to as "open" blocks). When an open block is no longer available for the storage of additional data, the block needs to be "closed" to free resources for opening another block. The present system may then perform a "close operation" on the open block. In some embodiments, the close operation includes an undesirable long-running erase operation on a related block.

The present disclosure relates to a system and method of reducing close operations on open blocks when writing data to a FAT file system on a flash memory, resulting in faster write performance for the user. The present flash memory system uses a table of open blocks, or blocks available for storage of additional data. Upon receipt of a write request sent by a host, the present flash memory system checks the table to determine whether a block is open. If the block is open, the present flash memory system refrains from closing the block. In contrast, in the traditional implementation, a traditional flash memory system closes the block after every write to preserve limited resources for opening another block. The present flash memory system does not close the block after every write as in the traditional flash memory system, in anticipation of improving write performance if the host sends a future write request to a related location. Therefore, the present flash memory system reduces the number of close operations required, compared to the traditional flash system. The system and method are implemented in the flash memory device.

Figure 1:
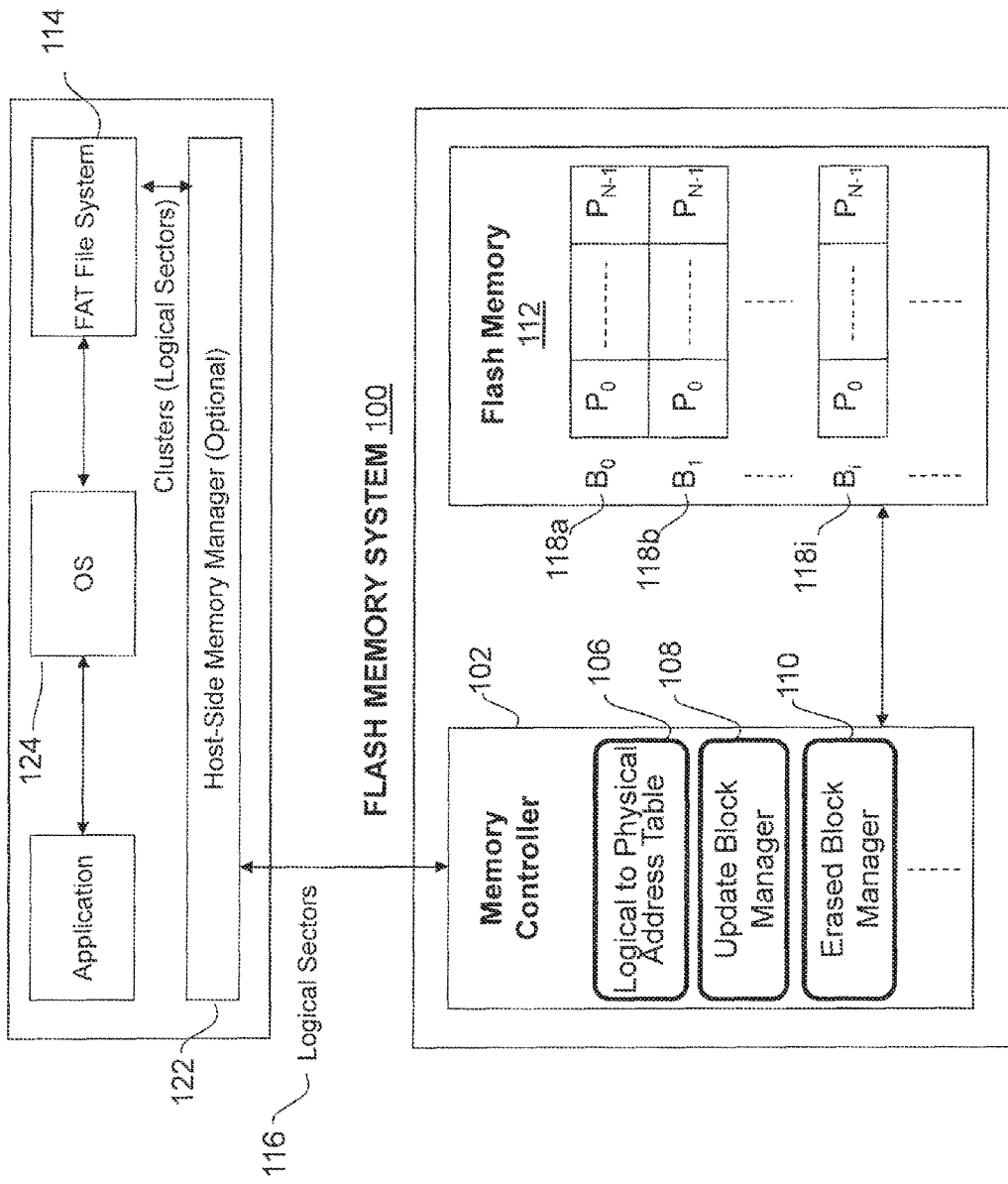
FIG. 1 illustrates a block diagram of a flash memory system coupled to a host in accordance with some embodiments of the present disclosure.

Turning now to the drawings, FIG. 1 illustrates a block diagram of a flash memory system coupled to a host in accordance with some embodiments of the present disclosure. FIG. 1 includes a flash memory system 100 coupled to a host 104. Host 104 includes applications 120, an operating system 124 and a FAT file system 114, and an optional host-side memory manager 122. A user interacts with host 104 through applications 120. Example applications include a web browser, word processor, spreadsheet, or games. These example applications use operating system ("OS") 124 to store files, for example on flash memory system 100. In some embodiments, OS 124 uses FAT file system 114 to store the files. When host 104 writes data to flash memory system 100, host 104 specifies in a write request (1) a logical block address (LBA) location at which to store the data, and (2) the binary data itself. Logical sectors 116 are a type of LBA. LBAs are unique for a memory device. LBAs typically increase linearly from 0 to the size of the memory device minus one. Host-side memory manager 122 optionally performs lower-level memory management at the host such as using LBAs, clusters, and logical sectors.

The flash memory includes flash memory system 100 with memory controller 102 and flash memory array 112. Memory controller 102 includes logical-to-physical address table 106, update block manager 108, and erased block manager 110 for managing flash memory array 112. Host 104 sends logical block addresses (LBA) of logical sectors 116 to flash memory system 100 which translates the LBAs into physical addresses. Memory controller 102 uses logical-to-physical address table 106 to translate the LBAs into physical block addresses. Memory controller 102 also is operable to track updated blocks using update block manager 108, and to erase blocks using erased block manager 110. Memory controller 102 may be implemented in hardware or software. Flash memory 112 is often implemented in hardware including physical blocks $B_0$-$B_i$ (118a-i). As described earlier, each block may contain multiple data units, illustrated in FIG. 1 by pages $P_0$ to $P_{N-1}$. To address and refer to smaller data units stored in the blocks, memory controller 102 may use pages, sectors, offsets, or clusters. A page represents the smallest unit of data that memory controller 102 can write to a block. A typical page can be 4 kilobytes, or 4,096 bytes.

FAT File System

The present disclosure groups the physical blocks in the flash memory array into virtual segments. The flash memory system uses a table of segments and open blocks, or blocks available for storage of additional data. Upon receipt of a write request sent by a host, the flash memory system determines a desired segment corresponding to the request and checks the table to determine whether a block in the desired segment is open. If the block is open in the desired segment, the flash memory system reduces a number of close operations required for writing to the FAT file system by refraining from closing the block after writing the requested data. In contrast, a traditional flash memory system would close the block after writing the requested data to preserve limited resources for opening another block. Because the present flash memory system does not close the block as a traditional flash memory system would, the present flash memory system reduces the number of close operations required, compared to the traditional flash system.

FIG. 1 illustrates that the host uses the FAT file system to store files by writing the file contents and data describing the file to the flash memory array.

FIGS. 2A, 2B, 2C(i)-(iii), and 2D(i)-(ii) illustrate block diagrams of writing files to FAT file system 114 in accordance with some embodiments of the present disclosure.

The FAT file system groups storage such as flash memory into two areas: (1) a FAT area, and (2) a data area. The present flash memory system allocates a portion of its blocks to the FAT area, and the remainder of its blocks to the data area. For example, with reference to FIG. 1, flash memory system 100 may allocate blocks $B_0$ (118a) and $B_1$ (118b) to the FAT area, and blocks $B_2$-$B_N$ (not shown) to the data area. FIG. 2A illustrates FAT file system 114 grouped into FAT area 202 and data area 204. FIG. 2B illustrates the interaction of FAT file system 114 with the present flash memory system. FAT area 202 can store FAT contents 206a and data area 204 can store file contents 208a. The FAT area includes a file allocation table which centralizes information about which regions in the data area belong to files, which regions are free or possibly unusable, and where each file is physically stored on the storage. For example, FAT contents 206a can include a filename ("fox.txt") and a cluster ("Cluster 5") where the host may find the file contents. As described earlier, in addition to data describing a file such as filename, FAT area 202 is also operative to store any suitable combination of data, including data describing which regions in the data area belong to files, which regions are free or possibly unusable, and where each file is physically stored on the storage. The FAT file system stores file contents in the data area. The memory controller stores and uses logical-to-physical table 106 to map the logical location ("cluster 5") to a physical location ("Block 118i"). Data area 204 includes file contents 208a ("The quick brown fox").

FIGS. 2C(i)-(iii) illustrate block diagrams of dividing flash memory array 112 with FAT file system 114 into segments in accordance with some embodiments of the present disclosure. FIG. 2C(i) includes FAT area 202 and data area 204 in FAT file system 114. FIG. 2C(ii) includes flash memory array 112, and segments 210, 212a-n. FIG. 2C(ii) illustrates that the present flash memory system groups the blocks of flash memory array 112 into virtual segments 210, 212a-n in accordance with some embodiments of the present disclosure. The total number of segments on the device may vary because the number of blocks may vary from device to device. FIG. 2C(iii) illustrates a relationship between segments and blocks in accordance with some embodiments of the present disclosure. Segment 1 (210) includes physical blocks including flash memory array blocks 118a, 118b, and segment 2 (212a) includes physical blocks including flash memory array block 118i. As described above, physical blocks refer to blocks in flash memory array 112. Unless expressly stated, the present disclosure uses the terms "blocks" and "physical blocks" interchangeably. The number of physical blocks grouped into a segment is generally uniform in a device. For example, a segment may include 128, 256, 412, or any other suitable number of blocks. A flash memory device may have any number of segments, based on the number of blocks on the device. As illustrated in FIGS. 2C(i)-(ii), FAT area 202 corresponds to segment 1 (210). Data area 204 may be divided into any number of additional segments 2 (212a), 3 (212b), through N (212n).

FIGS. 2D(i)-(ii) illustrate writing a file to FAT file system 114, as requested by the host. As illustrated in FIG. 2D(i), when the host sends a write request to the present flash memory system, the memory controller first writes FAT contents 206a to FAT area 202. As described above, FAT contents 206a may describe which regions in data area 204 belong to files, which regions are free or possibly unusable, and where the flash memory array physically stores the requested data in accordance with the FAT file system specification. As illustrated in FIG. 2D(ii), the memory controller next writes file contents 208a to data area 204. File contents 208a include the actual contents of the file, as provided by the host in its write request to the present flash memory system.

FAT Area

As described above, the FAT file system divides storage such as flash memory into two areas: (1) a FAT area, and (2) a data area. This section describes application of a single-sector algorithm leveraging a single-sector area of a block to write FAT contents to the FAT area.

FIGS. 3A and 3B(i)-(ii) illustrate block diagrams of updating FAT area 202 of flash memory array 112 with FAT file system 114 in accordance with some embodiments of the present disclosure. FIG. 3A illustrates FAT area 202 in FAT file system 114, corresponding to segment 1 (210) with block 304 in flash memory array 112.

FIG. 3B includes block 304 in FAT area 202. FIG. 3B also includes existing data 306 in block 304, and a single-sector area 308 for storing updated data. The following operation applies to writes of FAT contents to segment 1. The host requests a write operation to update existing data stored in a physical block A (304) in FAT area 202. The memory controller maintains information about the unused page size of every block, also referred to as a buffer area or single-sector area. When writing information to FAT area 202, the memory controller executes a program operation to write the data to the buffer area because the requested amount of data is smaller than the unused page size of physical block A (304). Program operations refer to flash memory operations for writing or re-writing data to flash memory array 112. The host requests to write data to logical sector 7 (310). Block A (304) already has existing data 306, but also has single-sector area 308 available for writing additional data. FIG. 3B(ii) illustrates that, after the write operation, the memory controller has updated Block A (304) with the requested information, and the size of single-sector area 312 has reduced. Techniques for writing data to a single-sector or buffer area of a block include, but are not limited to, those disclosed in U.S. Patent Application No. 61/527,913, entitled System and Method of Reducing Close Operations on Open Blocks When Writing Data to a Flash Memory, filed Aug. 26, 2011, which is incorporated by reference herein.

Data Area

As described above, the FAT file system divides storage such as flash memory into two areas: (1) a FAT area, and (2) a data area. Whereas FIGS. 3A, 3B(i)-(ii) illustrated writing to a FAT area, this section describes writing to a data area.

FIGS. 4A(i)-(ii), 4B(i)-(iv), 4C, 4D(i)-(ii), and 4E illustrate block diagrams of using open blocks and closed blocks in flash memory array 112 to update data area 204 of FAT file system 114 in accordance with some embodiments of the present disclosure. An open block refers to a block in the flash memory array available for partial storage of additional data without requiring an undesired long-running erase operation. A closed block refers to a block in the flash memory array not available for the storage of additional data. A closed block may require the memory controller to perform an undesired long-running erase operation. An unused block refers to a block in the flash memory array FIGS. 4A(i)-(ii), 4B(i)-(iv), 4C, 4D(i)-(ii), and 4E include a physical block 402 in flash memory array 112 with existing data 408a, an unused block 404, a copy 408b of existing data 408a, a target logical block address (LBA) 406, source data 410 requested by the host to update existing data on Block B, and an open block table 412. Whereas FIG. 3 illustrates writing information to FAT area 202, FIGS. 4A(i)-(ii), 4B(i)-(iv), 4C, 4D(i)-(ii), and 4E illustrate writing information to data area 204, which may result in open blocks or closed blocks.

FIGS. 4A(i)-(ii) illustrate that data area 204 in FAT file system 114 corresponds in flash memory array 112 to segments other than segment 1 (210). Segment 1 (210) corresponds to FAT area 202. The remaining segments, such as segment 2 (212a), correspond to data area 204. Data area 204 may be divided into any number of additional segments 2 (212a) through N (212n) based on the number of blocks on the device. Blocks 402, 404 illustrate exemplary blocks.

As illustrated in FIGS. 4B(i)-(iv), the memory controller maintains a limited number of blocks in an "open" condition. An open block refers to a block that has been programmed with partial data, and is available for storage of additional data. In FIG. 4B(i), the host requests a write operation to update source data 410 (shown in FIG. 4B(iv)). In FIG. 4B(i), physical block B (402) corresponding to logical block address X in the logical-to-physical table has an unused page size of zero for accepting new data, because existing (valid) data shown in gray occupies the entirety of Block B. The memory controller gathers an unused block 404 in the same segment, illustrated by Block M.

In flash memory architecture, the memory controller is only able to write pages in consecutive order. The memory controller writes data to page 1, then page 2, then page 3, etc.

In FIG. 4B(iii), the memory controller writes to Block M (404) an identical copy 408b of data 408a intended to reside before target LBA 406 requested by the host, illustrated by LBA X. In FIG. 4B(iv), the memory controller then writes the requested updated data 410 to block M (404) using program operations for the flash memory array. Program operations refer to re-write operations used by the memory controller to write data to a block. After writing updated data 410 to Block M (404), Block M (404) may be considered an open block, because it has been programmed with data but is still available to accept new data in a subsequent write operation from the host. The memory controller also updates the appropriate entries in the logical-to-physical table. Therefore, in FIG. 4B(iv), when the host makes subsequent read requests, depending on the logical address of the requested data, if the logical address corresponds to Block B (402), the memory controller will read the requested data from Block B (402). If the logical address corresponds to Block M (404), the memory controller will read the requested data from Block M (404). FIG. 4C illustrates that the memory controller updates open block table 412 to reflect the status that Block M (404) in segment 2 is a new open block.

In some embodiments, the number of open blocks is limited in the present flash memory system to one open block on the device, one open block per segment, or any other suitable number of open blocks on the device and/or open blocks on any suitable number of segments. This limitation is used because tracking information related to open blocks uses resources on the flash memory. For example, the memory controller uses resources to track unused page sizes in open blocks, and which blocks are open. Accordingly, the memory controller limits the number of open blocks at a time to conserve resources.

Whereas FIGS. 4B(i)-(iv) and 4C described open blocks, FIGS. 4D(i)-(ii) and 4E illustrate writing data resulting in a "closed" block. FIGS. 4D(i)-(ii) and 4E include updated data 410 requested by the host to be written, existing data 414a and a copy 414b of the existing data, and closed Block M (404). In contrast to an open block, a "closed" block generally is not available for storage of additional data. Because of constraints in the architecture of flash memory, the process of closing a block takes significantly longer than the process of opening a block. This is because, to close a block, the memory controller copies the remaining unmodified data in the original block to the new block. The memory controller then erases the original block from which the memory controller copied the data. Because of the flash memory architecture, erasing a block takes significantly longer than programming data to a block.

As illustrated in FIGS. 4D(i)-(ii) and 4E, the memory controller may close a block. Flash memory architecture limits the number of blocks that can be open at once due to limited resources for maintaining open blocks. The memory controller closes blocks when the memory controller chooses to open a different block. The memory controller may open a different block if the remaining free space in the current open block is not large enough to perform a requested write operation by the host. Alternatively, the memory controller may open a different block in a different segment from the current open block. In FIG. 4D(i), the memory controller decides to close Block M (404). Block M (404) is currently open and ready to accept additional data. After the memory controller decides to close Block M (404), the memory controller writes updated source data 410 from the host to the new Block M (404). The memory controller executes a program operation, also referred to as a write operation, of the remaining unmodified data 414a from Block B (402) to the Block M (404), as shown by data 414b. In FIG. 4E, the memory controller updates the logical-to-physical table to point to Block M (404), and executes an erase operation on Block B (402). The "X" in FIG. 4E illustrates that the memory controller now considers Block B (402) to be erased. Generally, the memory controller closes one block when the memory controller opens another, to conserve limited resources for tracking open blocks and to keep a total number of open blocks below a preset limit.

Closing Block M (404) results in an undesirable long-running erase operation on Block B (402). Block M (404) is full and cannot receive more data, but is not itself closed. Block M (404) contains data previously stored in Block B (402). Because Block M (404) contains data originally from Block B (402), the memory controller will not erase Block M (404). In FIG. 4E, the memory controller updates open block table 412 to reflect the status that there are no open blocks in segment 2 available for partial data. Block B (402) is now completely unused, and Block M (404) is full. As described earlier, it is desirable to reduce the number of close operations on blocks because in flash memory architecture, erasing a block takes significantly longer than programming data to a block.

Figure 5:
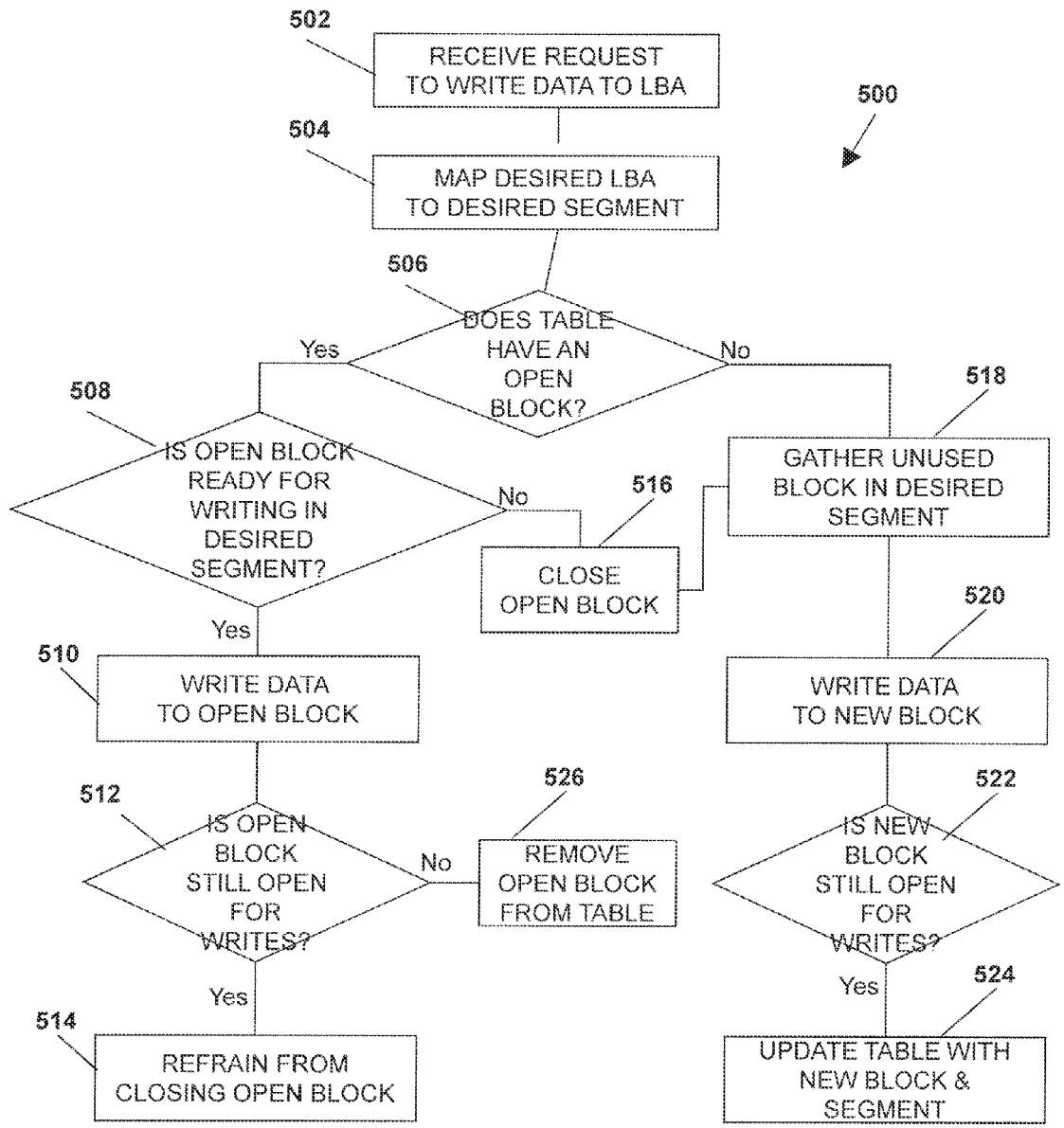
FIG. 5 illustrates a flow diagram of a process for reducing the number of close operations required for writing data to a FAT file system in accordance with some embodiments of the present disclosure.

FIG. 5 illustrates a flow diagram of a process 500 for reducing close operations on open blocks required for writing data to a FAT file system. The memory controller receives a write request to write source data to an LBA (step 502). The memory controller maps the desired LBA to a desired segment, denoted by a desired segment identifier (step 504).

In some embodiments, the memory controller maps the desired LBA as follows. When the memory controller receives a desired LBA from the host, the memory controller determines based on the logical-to-physical table the corresponding physical block information. As described in connection with FIGS. 2C(i)-(iii), the number of physical blocks per segment is generally uniform in a device. For example, a segment may include 128, 256, 512, or any other suitable number of blocks. Using the physical block information, the memory controller is able to determine which segment and segment identifier correspond to the desired LBA. If the physical block information from the logical-to-physical table corresponds to a physical block numbered 1000, for example, and there are 512 blocks per segment, the memory controller can determine that physical block 1000 corresponds to segment 2. For example, the memory controller calculates 1000 divided by 512, yielding 1.95, and calculates the ceiling function of the result, yielding 2 for the segment.

Using the segment identifier, the memory controller checks the open block table for an identifier of an existing open block and an identifier of a corresponding open segment in the system (step 506). The purpose of step 506 is to determine whether the desired segment has an existing open block. If the desired segment has an existing open block, the present flash memory system reduces a number of close operations required for the write operation by refraining from closing the existing open block, and using the existing open block to receive the updated data from the host. If the desired segment does not have an existing open block, the present flash memory system gathers an unused block in the desired segment and writes the data to the new block.

In some embodiments, the memory controller uses multiple open block tables. In some embodiments, the memory controller uses the update block manager to manage the open block tables. For example, the memory controller uses one open block table per segment. In further embodiments, when the memory controller uses one open block table per segment, the memory controller only stores the open block identifier rather than additionally storing the segment identifier. The memory controller then determines the segment identifier based on the segment associated with the open block table. In other embodiments, the memory controller keeps multiple blocks open on the device and stores all open block identifier information and corresponding segment identifier information in a single open block table. In still other embodiments, the memory controller stores only the open block identifier and determines the segment identifier based on the physical block information of the open block as described above.

If the open block table has an existing open block, the memory controller determines whether the existing open block is ready for writing in the desired segment (step 508). In some embodiments, the memory controller determines whether the existing open block is ready for writing by comparing the desired segment with the segment associated with the open block.

If the desired segment matches the segment of the existing open block, the memory controller writes the data to the existing open block (step 510). After writing the data to the existing open block, the memory controller determines whether the open block is still open for more writes (step 512). If the open block is still open, the memory controller refrains from closing the open block (step 514). If the open block is full, the memory controller treats the block as any other full block and no longer open. The memory controller removes the open block and segment from the open block table (step 526).

If the desired segment does not match the segment associated with the open block, the memory controller closes the open block (step 516) to free limited resources for opening another block in the desired segment. As described in connection with FIGS. 4D(i)-(ii), the close operation results in the open block receiving all data from the original block. Because the number of open blocks on the present system may be limited, the memory controller closes the open block to have enough resources to open a block in the desired segment.

If the open block table does not have an open block, or if the desired segment does not match the segment associated with the open block, the memory controller gathers an unused block in the desired segment (step 518) to store the updated data, as described in connection with FIG. 4B(i)-(iv). The memory controller then writes the data to the new block (step 520). As described in steps 522-524, writing data to the unused block may result in the block being partially full and available for further write operations. In other words, writing data to the unused block may result in the block being considered open after completion of the desired write. Accordingly, the memory controller checks whether the new block is open after writing the source data (step 522). If so, the memory controller updates the open block table with the identifier of the new block and with the identifier of the segment corresponding to the new block (step 524). If the new block is full after writing the source data, the memory controller does not update the open block table.

The flash memory system reduces the number of close operations performed on open blocks because, if the desired segment already has an open block, then the flash memory system reuses the open block without the need to perform a costly close operation.

FIGS. 6A-6D illustrate segments used when writing files to the FAT file system, as requested by the host in accordance with some embodiments of the present disclosure. The present system reduces a number of close operations required when writing subsequent files to physical blocks according to the FAT file system specification by refraining from closing an existing open block in case the host directs a future incoming write to the same segment. FIGS. 6A-6D show the memory controller updating physical blocks in segment 1 (FIG. 6A), followed by segment 2 (FIG. 6B), followed by segment 1 (FIG. 6C), followed by segment 3 (FIG. 6D). Writing to many different segments may result in the memory controller performing many close operations to allow for open blocks in each new segment. In contrast, repeated writes to the same segment may allow the memory controller to refrain from closing an open block in the desired segment.

According to the FAT file system specification, the host writes files in two stages: first to the FAT area, and then to the data area. In the present flash memory system, the write behavior of the FAT file system results in the memory controller writing data to different segments. Writing data to different segments may result in the memory controller performing many close operations. FIGS. 6A-6D illustrate the segments used in an example write. In FIG. 6A, the memory controller writes FAT contents 206a to FAT area 202. As described above, FAT contents 206a may describe which regions in data area 204 store file contents, which regions are free or possibly unusable, and where the requested data is physically stored on flash memory array 112 in accordance with the FAT file system specification. For example, FAT contents 206a may contain a filename ("fox.txt") and a cluster ("cluster 5") where the host may find the file contents. Because FAT area 202 corresponds to segment 1 (210), the memory controller performs the first write to segment 1 (210).

In FIG. 6B, the memory controller writes file contents 208a ("The quick brown fox") to data area 204 corresponding to the data requested to be written by the host. Because segments 2-N correspond to data area 204, memory controller updates blocks 402, 404 in segment 2 (212a).

As described in connection with FIG. 2C(i)-(iii), FAT contents 206a, 206b are on one segment of flash memory array 112, referred to as segment 1 (210), and file contents 208a, 208b may be on different segments, for example segment 2 (212a) and segment 3 (212b).

In the traditional implementation, if file contents 208a correspond to an open block on one segment, and file contents 208b correspond to a block on another segment, the memory controller closes the block containing the updated data after each write operation to conserve limited resources and allow for an open block in the next segment. Accordingly, the flash memory system may have to perform as many as three close operations to write the data as requested by the host. The close operations correspond to closing blocks in FIGS. 6A, 6B, and 6C. In FIG. 6A, a traditional flash memory system first closes block 304 corresponding to FAT contents 206a in segment 1 (210), before writing the requested file content 208a to the block in segment 2 (212a) in FIG. 6B. A traditional flash memory system then closes block 402 in segment 2 (212a) corresponding to file contents 208a in FIG. 6B, before writing the requested FAT contents 206b to block 304 in segment 1 (210) in FIG. 6C. Lastly, the flash memory system then closes block 304 in segment 1 (210) corresponding to FAT contents 206b, before writing the requested file contents 208b to block 602 in segment 3 (212b).

In contrast, the present flash memory system reduces the number of close operations required when the host requests the present flash memory system to write data to repeated segments in flash memory array 112. For example, in the traditional implementation, when the memory controller alternates writing from segment 2 to segment 1 to segment 2, the memory controller closes the block in each segment after writing. In the present flash memory system, when the memory controller alternates writing between segment 2 to segment 1 to segment 2, after the first write to segment 2 the memory controller keeps an open block in segment 2 and tracks the open block in the open block table. After the write to segment 1, the memory controller uses the single-sector algorithm described in connection with FIGS. 3B(i)-(ii), which does not require closing a block. The second write to segment 2 repeats the desired segment (segment 2) from the first write. Accordingly, the performance of the second write operation to repeated segment 2 is faster because the present flash memory system is able to reuse the existing open block in segment 2 rather than having to close the existing open block when writing to segment 1.

FIGS. 7A(i)-(v) and 7B(i)-(v) illustrate block diagrams of a system for reducing a number of close operations required for writing data to a FAT file system. As described in connection with FIGS. 6A-6D, writing data to a FAT file system can result in the memory controller switching back and forth between many segments for writing. FIG. 7A(i) illustrates a process of reducing close operations while writing a second file to the FAT file system after a first file has been written, when the desired segment for the second file matches an open segment tracked in open block table 412. Specifically, FIGS. 7A(i)-(v) show writing to blocks in segment 2 (212a), then segment 1 (210), then segment 2 (212a). Because the memory controller repeats the second write to segment 2 (212a), the present disclosure reduces a number of close operations required when writing to multiple segments of the flash memory array.

FIG. 7A(i)-(v) include physical block B (402) and open block M (404) in data area 204, open block table 412, and block A (304) in FAT area 202. In FIG. 7A(i), the flash memory system has finished writing a first file. With reference to FIG. 6B, writing a first file may reference segment 2 (212a) to update blocks 402, 404 according to the open block process described in connection with FIG. 5. Segment 2 (212a) includes Block M (404), an open block. Upon updating data in Block B (402), the memory controller copies to Block M (404) the existing data from Block B (402) prior to the logical block address of the updated data. The memory controller then writes the updated data from the host to Block M (404). Because Block M (404) still has pages available (shown in white in FIG. 7A(i)) to receive additional data, the memory controller considers and tracks Block M (404) as open. As shown in FIG. 7A(ii), because Block M (404) is open, the memory controller tracks in open table 412 that Block M (404) in segment 2 (212a) is open.

FIG. 7A(iii) illustrates the memory controller receiving an update request from the host to update a second file. This update request results in the memory controller switching from segment 2 (212a) to segment 1 (210) to segment 2 (212a). In FIGS. 7A(iii)-7A(iv), the flash memory system performs the requested updates corresponding to FIG. 7A(iii) by writing FAT contents to FAT area 202 in segment 1 (210).

As described in FIG. 3, the memory controller updates a single-sector area of Block A (304) with updated FAT contents which does not require closing open Block M (404).

In some embodiments, the memory controller saves open block table 412. Otherwise, the memory controller might inadvertently overwrite open block table 412 when the memory controller writes FAT contents to segment 1 (210).

As illustrated in FIG. 7A(iii), the memory controller writes FAT contents to segment 1 (210) corresponding to cluster 7 into the single-sector area as illustrated and described in FIGS. 3B(i)-(ii) and accompanying text.

In FIGS. 7A(iv)-(v), the present flash memory system switches from segment 1 (210) to update segment 2 (212a), such as writing file contents to data area 204. The requested update is in segment 2 (212a), which is the same segment containing the existing open block which the memory controller refrained from closing. Accordingly, the flash memory system reduces a number of close operations because Block M (404) in segment 2 (212a) is already open.

In some embodiments, as illustrated in FIG. 7A(iv), flash memory controller 102 restores the saved copy of open block table 412.

As illustrated in FIG. 7A(v), the memory controller writes the requested information to open block M (404) in data area 204. The memory controller reduces a number of close operations because the memory controller is able to continue writing data to the same open block M (404) referenced in open block table 412 because the desired segment for the second write matches the segment of the existing open block. Accordingly, the present flash memory system avoids performing a close operation by writing the data corresponding to the second file to the existing open block referenced in open block table 412. Therefore, the present flash memory system reduces a number of close operations required for writing data to a FAT file system.

In contrast to FIGS. 7A(i)-(v), FIGS. 7B(i)-(v) illustrate the traditional process of writing a second file when the desired segment is different from an open segment tracked in open block table 412. Because the desired segment (segment 3 (212b)) is different from the open segment (segment 2), the present memory system needs to close Block M (404) as happens in the traditional system.

In FIG. 7B(i)-(v), the memory controller switches from segment 2 to segment 1 (210) to segment 3 (212b). FIG. 7B includes block B (402) and a block C (602) in data area 204, open block table 412, and block A (304) in FAT area 202. Because the identifier of the desired segment (segment 3 (212b)) is different from the identifier of the open segment (segment 2) tracked in open block table 412, the present flash memory system closes the open block tracked in open block table 412 before writing the requested data to a block in the desired segment, as happens in the traditional system.

In FIG. 7B(i), the flash memory system has performed updates to segment 2 corresponding to FIG. 7A(ii). That is, the memory controller has finished updating Block B (402) in segment 2 by writing data corresponding to a first file to Block M (404) in data area 204. As described in connection with FIG. 7A(i), Block M (404) is still available to accept partial data and the memory controller therefore considers Block M (404) to be open.

The memory controller then receives an update request from the host to update a second file. This update request results in updates switching between segment 1 (210) and segment 3 (212b). In FIGS. 7B(ii)-(iii), the memory controller performs the requested updates corresponding to FIG. 6C by writing information to FAT area 202 in segment 1 (210).

In some embodiments, as illustrated in FIG. 7B(ii), the memory controller saves open block table 412, for the same reason as described above. Otherwise, memory controller 102 might inadvertently overwrite open block table 412 when memory controller 102 writes FAT contents to segment 1 (210).

As illustrated in FIG. 7B(iii), the memory controller writes FAT contents into the single-sector area as illustrated and described in FIG. 3 and accompanying text. In FIGS. 7B(iv)-(v), the flash memory system performs updates corresponding to FIG. 6D by writing the requested information to data area 204. In some embodiments, as illustrated in FIG. 7B(iv), the memory controller restores the saved copy of open block table 412, as described above. As illustrated in FIG. 7B(v), the memory controller writes the requested information to block C (602) in data area 204. To write the requested information to Block C (602), the memory controller first closes Block M (404), as illustrated and described in FIGS. 4D(i)-(ii) and accompanying text.

Therefore, the present system and method reduce the number of required close operations for a FAT file system on a flash memory system by deferring the closing of blocks if the flash memory system is writing to a block that is already open, as tracked in an open block table.

Those of skill in the art would appreciate that the various illustrations in the specification and drawings described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

It will be understood that other types of non-volatile mass storage devices in additional to flash memory devices may also be utilized for mass storage.

We claim:

1. A method for reducing the number of close operations performed on open blocks on a flash memory storage, the method comprising:
    dividing the flash memory storage into virtual segments, wherein each virtual segment includes blocks of flash memory cells;
    maintaining a plurality of collections, each collection being associated with a segment among the virtual segments, each collection tracking open blocks in the associated segment
    mapping a memory identifier to a desired segment from among the virtual segments, the memory identifier designating a memory location for writing data based on a received write request;
    retrieving a previously open segment from among the virtual segments and a previously open block from the collection associated with the previously open segment;
    when the desired segment matches the previously open segment and the previously open block can store the data from the received write request, writing the data to the previously open block without closing the previously open block; and
    when the desired segment is different from the previously open segment, closing the previously open block, writing the requested data to a block in the desired segment, and updating the collection with the block in the desired segment.

2. The method of claim 1, wherein the memory identifier comprises a memory address.

3. The method of claim 1, wherein the memory identifier comprises a logical block address (LBA).

4. The method of claim 1, wherein the flash memory is configured with a File Allocation Table (FAT) file system.

5. The method of claim 4, wherein the FAT file system comprises a FAT area and a data area.

6. The method of claim 5, wherein the FAT area and the data area correspond to different segments from the virtual segments.

7. The method of claim 1, wherein the retrieving further comprises determining the previously open segment based on a physical location of the previously open block.

8. A memory system comprising
    a flash memory comprising a plurality of blocks of flash memory cells, wherein each block is configured to store data; and
    a flash memory controller configured to:
        divide the flash memory storage into virtual segments, wherein each virtual segment includes blocks of flash memory cells,
        maintain a plurality of collections, each collection being associated with a segment among the virtual segments, each collection tracking open blocks in the associated segment,
        map a memory identifier to a desired segment from among the virtual segments, the memory identifier designating a memory location for writing data based on a received write request,
        retrieve a previously open segment from among the virtual segments and a previously open block from the collection associated with the previously open segment,
        when the desired segment matches the previously open segment and the previously open block can store the data from the received write request, write the requested data to the previously open block without closing the previously open block, and
        when the desired segment is different from the previously open segment, to close the previously open block, configured to write the requested data to a block in the desired segment, and to update the collection with the block in the desired segment.

9. The system of claim 8, wherein the memory identifier comprises a memory address.

10. The system of claim 8, wherein the memory identifier comprises a logical block address (LBA).

11. The system of claim 8, wherein the flash memory is configured with a File Allocation Table (FAT) file system.

12. The system of claim 11, wherein the FAT file system comprises a FAT area and a data area.

13. The system of claim 12, wherein the FAT area and the data area correspond to different segments from the virtual segments.

14. The system of claim 8, wherein the flash memory controller configured to retrieve is further configured to determine the previously open segment based on a physical location of the previously open block.

15. A non-transitory computer program product, tangibly embodied in a computer-readable medium, the computer program product including instructions operable to cause a data processing apparatus to:
    divide the flash memory storage into virtual segments, wherein each virtual segment includes blocks of flash memory cells;
    maintain a plurality of collections, each collection being associated with a segment among the virtual segments, each collection tracking open blocks in the associated segment
    map a memory identifier to a desired segment from among the virtual segments, the memory identifier designating a memory location for writing data based on a received write request;

retrieve a previously open segment from among the virtual segments and a previously open block from the collection;

when the desired segment matches the previously open segment and the previously open block can store the requested data, write the requested data to the previously open block without closing the previously open block; and when the desired segment is different from the previously open segment, closing the previously open block, writing the requested data to a block in the desired segment, and updating the collection with the block in the desired segment.

16. The computer program product of claim 15, wherein the memory identifier comprises a memory address.

17. The computer program product of claim 15, wherein the memory identifier comprises a logical block address (LBA).

18. The computer program product of claim 15, wherein the flash memory is configured with a File Allocation Table (FAT) file system.

19. The computer program product of claim 18, wherein the FAT file system comprises a FAT area and a data area.

20. The computer program product of claim 19, wherein the FAT area and the data area correspond to different segments from the virtual segments.

* * * * *